Jan. 7, 1969  C. LORENZEN  3,420,239
SEPARATOR FOR TOMATO HARVESTER
Filed June 13, 1966  Sheet 1 of 2

INVENTOR
COBY LORENZEN
BY
Owen, Wickersham & Erickson
ATTORNEYS 3,420,239
SEPARATOR FOR TOMATO HARVESTER
Coby Lorenzen, Davis, Calif., assignor to The Regents of The University of California, Berkeley, Calif.
Filed June 13, 1966, Ser. No. 557,158
U.S. Cl. 130—30
Int. Cl. A01d 45/00
9 Claims This invention relates to improvements in tomato harvesters, with particular reference to the separator unit in which the tomatoes are separated from the tomato plants.

Among tomato harvesters presently in use, there are several methods of separation. One of the most successful of these has resembled a straw walker; it has a series of horizontal parallel arms mounted on adjacent cranks separated 180° in rotation. Each point on each arm describes a nearly circular path; so the arms move the vines that are placed on them in a combination of vertical and horizontal motions which impart a shaking action to the vines while at the same time transporting the vines from one end of the arms to the other.

Some objections have been raised to the walking arm system. One is that fruit disposed in certain regions of the vine has come into contact with the arms during the rising component of their motion, imparting a vertically upward velocity to the fruit, and in some instances the fruit has been bounced against several arms before dropping between the arms onto the collecting conveyor below; this action has tended to damage the fruit. It has also been found that an increase in the rotational speed of the cranks above a certain value results in decreasing the shaking action of the unit. This has been due to the fact that the vine takes a finite time to drop back to the arms after receiving a vertically upward motion from the action of the arms. As the speed of the arms is increased, a condition is reached where the arms move downward through their complete travel and back upward through a significant portion of their upward travel before they again contact the vine. This fact has limited the rate at which the vines can be moved through the system, so that the harvesting speed has been limited.

The present invention overcomes these objections by providing a different type of separating action, wherein there is a relatively small vertical component even though there is a rapid shaking action.

Horizontal oscillation has been tried before, but heretofore resulted in less complete harvesting and has been unsuccessful in meeting the requirements for faster and better harvesting.

The present invention will be better understood and other objects and advantages will become apparent from the following description of a preferred embodiment.

Figure 1:
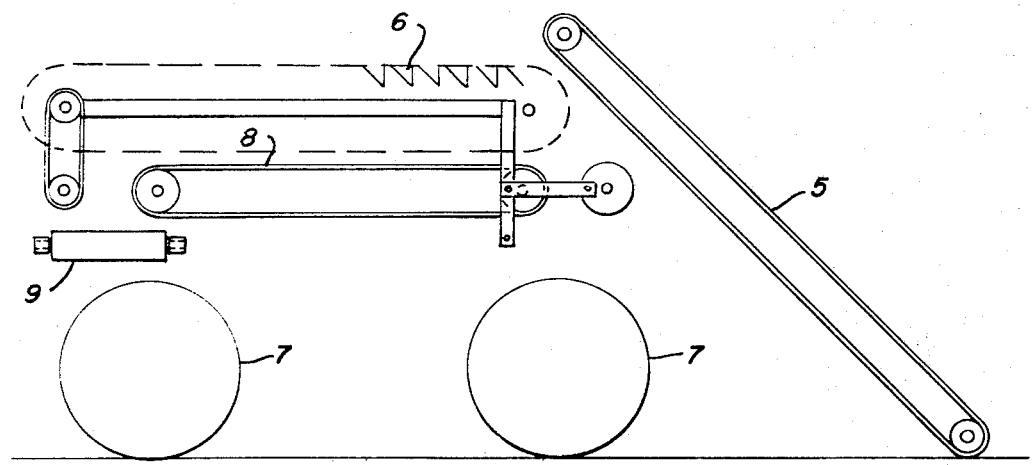
FIG. 1 is a simplified schematic view of a tomato harvester incorporating the principles of the invention.

Like the tomato harvester of U.S. Patent 3,199,604, the present invention has an elevator or pickup 5 which picks up severed tomato plants (the harvester usually carries a cutter (not shown) ahead of the elevator) and conveys them to a locus above a separator 6 and then drops them on the separator 6. The pickup 5 moves gently at the ground speed of the wheels 7 of the harvester, and the vines are carried up it with the tomatoes still vegetatively attached. All the separation is to take place at the separator 6.

At the separator 6, the tomatoes are separated from their vines and fall down onto a collecting conveyor 8, which moves them rearwardly to one or more rear cross conveyors 9, whence the tomatoes are carried to sorting conveyors (not shown here). The vines fall off the rear end of the separator 6. In this unit, the separator 6 and collecting conveyor 8 are preferably on a horizontal plane, though they may be inclined if desired.

The shaker or separator 6 of the present invention comprises a series of horizontal parallel arms 10, 11, 12, etc. mounted on a linkage system in such a manner that the adjacent arms are moved in a horizontally oscillating motion with the adjacent arms out of phase by 180°. Sprockets 15 and 16 are mounted at the two ends of each arm and are arranged so as to carry a chain 17 along the top and bottom edges 18 and 19 of each arm 10, 11, 12 etc. Each chain 17 carries a multiplicity of evenly spaced flights or fingers 20 extending upwardly from the chain 17 as it lies along the top edge 18 of the arm, and each chain 17 is driven to move at a fixed velocity backward along the top edge 18.

In operation, the combination of the forward-and-back oscillating arms 10, 11, 12, etc., and the rearwardly driven chains 17 and flights 20 imparts an intermittent motion to the vines which are in contact with the upper edges of the arms, and at the same time the vines are moved positively to the rear of the arms 10, 11, 12, etc., by the chains 17. Varying the horizontal oscillating displacement of the arms 10, 11, 12, etc., and the velocity of the chains 17 enables a positive control of the rate of transport of the vines through the unit which apparently has no practical limit except that dictated by the energy or component strength requirement. The elimination of most of the vertical component of the separator arms also eliminates any damage due to the bouncing action of the fruit and vines.

More specifically, in the embodiment shown the arms 10, 11, 12, etc., are shown with a pivot pin 21 secured to an arm 22 which is mounted along a shaft 23 on the front axis, and the approximate center of each arm 22 is secured by a link 24 to a crank 25 of a crankshaft 26 preferably forward of the axis. It will be noted that adjacent cranks 25 are 180° apart, this being usually the most desirable arrangement, and the crankshaft 26 can be rotated in either direction, since it results in simple forward-back movement of the arms.

At the rear axis is a shaft 27, which preferably rotates in the direction shown, and on which are a series of supporting arms 28 pivotally attached to support the main separator arm 10, 11 or 12, being attached to pivot pins 29 on those arms. In addition, there are belt or chain members 30 which are secured rotatably to the arm 28 and in a driving relation on the rear axle 27, by pulley wheels 31 and 32. Thus, driving the rear axle 27 rotates the belt or chain 30 and drives the sprockets 16, which in turn act to drive the chains 17.

Figure 3:
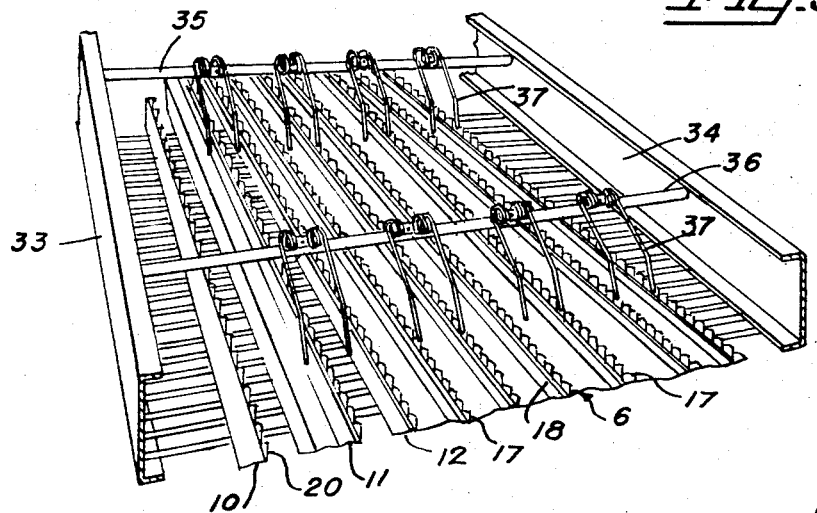
FIG. 3 is a view in perspective from one end of a separator of the FIG. 2 type, the view being broken off to conserve space.
Figure 2:
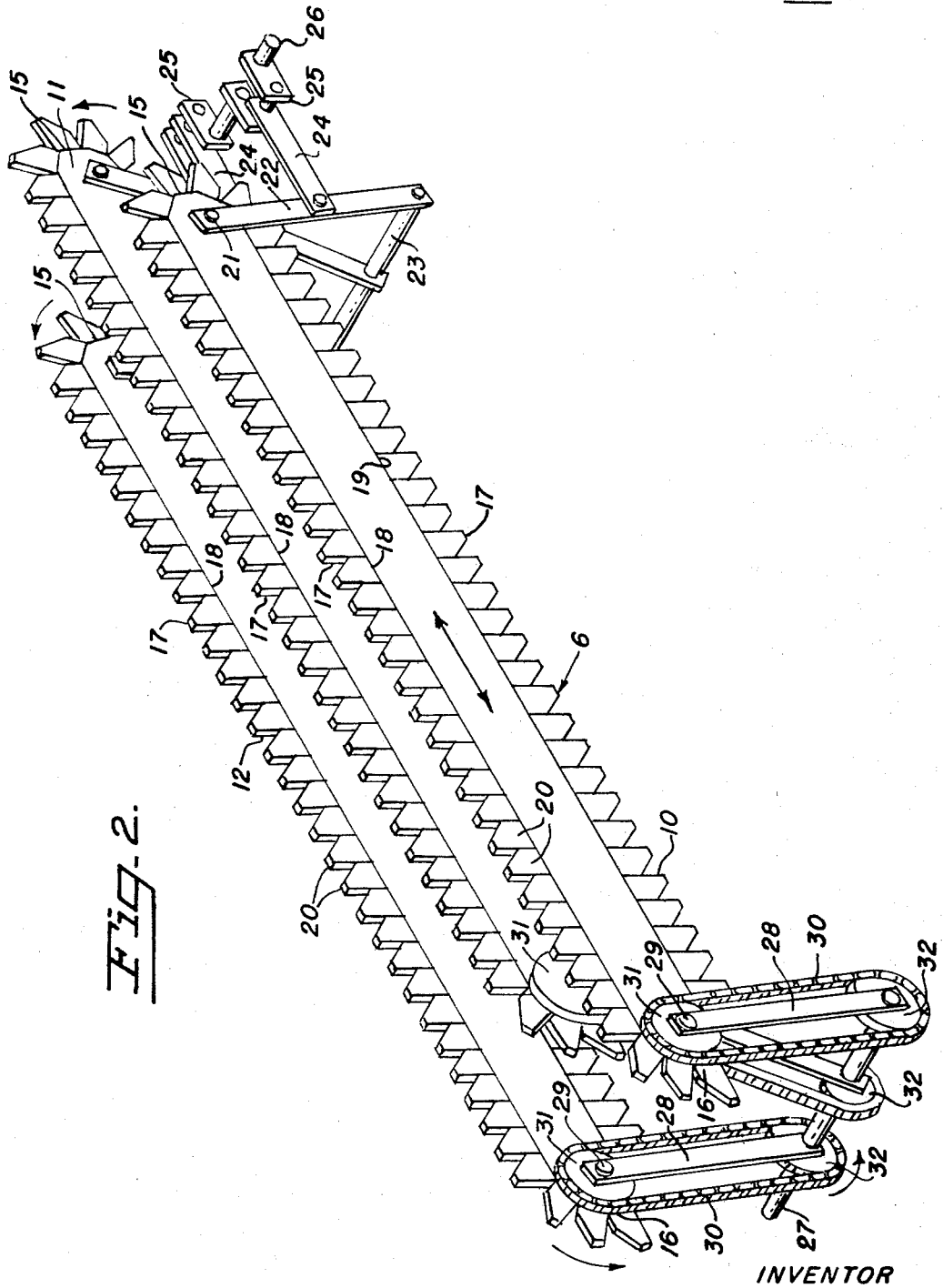
FIG. 2 is a view in perspective of a portion of a separator system embodying the principles of the invention.

As shown in FIG. 3, the separator 6 may be located between side walls 33 and 34, which confine the plants. There may also be a pair of cross shafts 35 and 36 which carry a plurality of combs 37.

In operation, as pointed out earlier, the combined oscillating movement of the arms 10, 11, 12, etc., and the forward movement of the chains 17 and their fingers 20 serve to disconnect the tomatoes from their stems and to shake them through the vines. In harvesters heretofore, heavy crop-yield conditions have tended to cause the fruit to be cradled in the vines and carried out the rear end of the machines. In this invention, the chains 17 of different arms 10, 11, 12, etc., may be driven at different speeds, by varying the sizes of the sprockets 31 from arm to arm or by other means for obtaining differential speeds.

Thereby, an action results which spreads the elements of the vine, opening the network of branches, and enabling the fruit to fall through, giving an increased recovery rate of the fruit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. In a tomato harvester, a separator for separating the fruit from the vines, including in combination:
   a plurality of parallel horizontal arms,
   means for oscillating said arms lengthwise of their longitudinal axis along a horizontal plane, with adjacent arms having a position 180° out of phase to provide movement in opposite directions, and
   an endless chain device having crop engaging means and mounted on each said arm and having a forwardly moving bottom run and a rearwardly moving top run.

2. The harvester of claim 1 wherein there is a horizontal collecting conveyor beneath said separator.

3. The harvester of claim 1 wherein each said arm has sprockets mounted at opposite ends of said arm for engagement with said endless chain device.

4. The harvester of claim 1 wherein each said endless chain device carries a multiplicity of spaced-apart fingers extending upwardly from the top run thereof, each said chain being driven at a fixed velocity.

5. The harvester of claim 4 wherein some chains are driven at different speeds from others.

6. The harvester of claim 1 wherein said means for oscillating comprises a crankshaft at one end of said arms having cranks thereon disposed with successive cranks 180° apart, links connecting said one end of each of said arms to said cranks, a second shaft at the other end of said arms, links pivoted to said second shaft and to the other end of each said arm, and means for driving said crankshaft.

7. The harvester of claim 5 wherein said second shaft carries sprockets and each arm has a corresponding first sprocket and a corresponding second sprocket, and drive means connecting each said shaft-carried sprocket to a said first sprocket, each said second sprocket being driven by a said first sprocket and engaging and driving said chain drive means.

8. The harvester of claim 6 wherein said chain drive means has a plurality of outwardly projecting fingers that project upwardly from said top run.

9. A tomato harvester including in combination:
   pickup means for elevating severed tomato vines from the ground to an upper level with the tomatoes still attached to the vines,
   separating means below said upper level, on which said pickup means deposits the tomato vines with their tomatoes attached, for separating the tomatoes from the vines, said separating means including
   a plurality of parallel horizontal arms,
   means for oscillating said arms lengthwise of their axis with adjacent arms 180° out of phase,
   an endless chain device mounted on each said arm and having a forwardly moving bottom run and a rearwardly moving top run, and
   a horizontal collecting conveyor beneath said separating means for collecting and carrying the separated tomatoes.

References Cited
UNITED STATES PATENTS

| | | | |
|---|---|---|---|
| 1,426,498 | 8/1922 | Owen | 130—27 |
| 1,662,467 | 3/1928 | Minshall | 209—308 |
| 2,710,097 | 6/1955 | Bolles | 209—78 |
| 3,193,020 | 7/1965 | Button | 171—14 |
| 3,199,604 | 8/1965 | Lorenzen et al. | 171—27 |
| 3,252,464 | 5/1966 | Hill et al. | 130—30 |
| 3,252,520 | 5/1966 | Hill et al. | 171—27 X |
| 3,340,935 | 9/1967 | Osimma | 171—14 |

ALDRICH F. MEDBERY, *Primary Examiner.*

U.S. Cl. X.R.

209—308, 78; 171—27